United States Patent [19]
Stephens et al.

[11] Patent Number: 5,830,384
[45] Date of Patent: Nov. 3, 1998

[54] COOL INSULATOR

[75] Inventors: William D. Stephens, Huntsville; Christi L. Salter, Decatur; Gregory K. Hodges, Trinity; Terry E. Hice, Athens; Jonathon S. Prickett, Grant, all of Ala.

[73] Assignee: The United States of America as represented by the Secretary of the Army, Washington, D.C.

[21] Appl. No.: 885,703

[22] Filed: Jun. 30, 1997

[51] Int. Cl.$^6$ .................................. H01B 3/28; C09K 5/00
[52] U.S. Cl. .......................... 252/194; 252/67; 252/77; 252/78.3; 523/138
[58] Field of Search .......................... 252/194, 67, 78.3, 252/77; 523/138

[56] References Cited

U.S. PATENT DOCUMENTS

| | | | |
|---|---|---|---|
| 2,683,667 | 7/1954 | Utter | 106/58 |
| 4,008,170 | 2/1977 | Allan | 252/194 |
| 4,421,806 | 12/1983 | Marks et al. | 428/36 |
| 4,492,779 | 1/1985 | Junior et al. | 523/138 |
| 4,515,912 | 5/1985 | Sayles | 523/456 |
| 4,600,732 | 7/1986 | Junior et al. | 523/138 |
| 4,624,885 | 11/1986 | Mumford et al. | 428/222 |
| 4,878,431 | 11/1989 | Herring | 102/290 |
| 4,956,397 | 9/1990 | Rogowski et al. | 523/138 |
| 5,342,597 | 8/1994 | Tunison | 423/335 |
| 5,352,312 | 10/1994 | Guillot | 156/172 |
| 5,500,402 | 3/1996 | Vangbo | 502/408 |

*Primary Examiner*—Joseph K. McKane
*Assistant Examiner*—Deanna Baxan
*Attorney, Agent, or Firm*—Freddie M. Bush; Hugh P. Nicholson

[57] ABSTRACT

The cool insulator incorporates a water gel coolant and poly-p-ethylene terephthalamide fibers (Kevlar) in an elastomeric rubber binder selected from the group consisting of silicon rubber, ethylene-propylene-diene-monomer, polybutadiene, and polyisoprene. The fiber provides erosion resistance required for long motor burning periods. This insulation includes a submicroscopic particulate water source with high temperature water release properties. The submicroscopic particulate water source is in the form of a flowable solid when formulated and in a weight percent amount from about 10 to about 20. The preferred water source is submicroscopic particulate silica containing over $11 \times 10^{15}$ particles per gram and has a surface area of about 200 square meters per gram. The submicroscopic particulate silica is known as "dry water" and specifically described by its method of preparation in commonly assigned U.S. Pat. No. 4,008,170. The submicroscopic particulate silica water source is retained during processing and during a curing temperature up to about of 145° F. The specific water source functions to provide water retention cooling up to about 150° C. to thereby provide more efficient cooling as a result of lowering the thermal conductivity of the cool insulator in which it is formulated.

2 Claims, No Drawings

COOL INSULATOR

DEDICATORY CLAUSE

The invention described herein may be manufactured, used, and licensed by or for the Government for governmental purposes without the payment to us of any royalties thereon.

BACKGROUND OF THE INVENTION

Filament-reinforced resin rocket motor cases have been extensively used in the propulsion. Several advantages have resulted from employment of filament-reinforced resin motor cases. Some of the advantages include: light weight motor case, less insulation requirements for the filament-reinforced resin motor case, the ease of manufacture, storage transportation, and stability against sparking or electrical conductance malfunctions.

Insulation requirements have been increased because of higher combustion temperature of advanced propellant. Advance interceptor motor case technology has placed additional requirements on the propulsion industry to ensure that these motor cases withstand the stresses due to high acceleration forces resulting from employing ultrahigh burning rate propellants and control systems which achieve high maneuverability to execute difficult tactical movements. The filament-reinforced composite motor cases and insulation containing graphite-fiber-reinforced or Poly-p-ethylene terephthalamide (Kevlar)-reinforced-case or insulation fabrication materials with modified resin blend yielded a higher burst pressure of about 7200 PSI as compared with a burst pressure of about 6400 PSI for graphite -composite. An example of this improved Kevlar reinforced case is disclosed in commonly assigned U.S. Pat. No. 4,515,912 which issued on May 7, 1985 to David C. Sayles. The improved case resulted from employing a matrix resin composition comprising about 100 parts by weight of a first component which is a two component mixture of approximately equal parts by weight of a diglycidyl ether of bisphenol A and an epoxized dimer of oleic acid, about 25 parts by weight of a second component of butanediol diglycidyl ether, about 20 parts by weight of a third component of a curing agent of 0-phenylenediamine-boron trifluoride etherate, and about 15 parts by weight of a fourth component of the bisspiroortho carbonate 3,9(5'-norborene-2'-yl)-1,5,7,11-tetraoxaspiro{5.5}undecane. The bisspiroortho carbonate is an expandable component during polymerization or curing phase of the matrix resin composition which achieves a conversion of the specified first three components of the matrix composition from a shrinkable matrix resin composition during polymerization or curing phase of the matrix resin composition.

Current industry standard silicone rubber binders for rocket motor insulation compositions are Dow Corning's DC93-104 and Shin Etsu's SE-X-32-878. Current insulation contain asbestos or Kevlar fibers in rubber binders. The industry standard insulations contain up to 40% asbestos (12–15% water) which corresponds to not more than 6% total water in the insulation. With a recognized health hazard of using asbestos fibers in industrial processes, non-asbestos graphite fibers or Kevlar fibers are preferred fiber choices. However, asbestos fibers provide a useful function of conductance of heat of the flame front away from the underlying rubber binder remaining below the extending asbestos fibers into the flame front. Thus, the remaining asbestos fibers function to improve the efficiency of the rubber insulator over an elapsed time period. The cooling effect of water in the asbestos is limited since not over 6% total water remains after processing conditions of the rubber insulations material. The cooling effect by the water plus the conductance cooling of the asbestos fibers mean that with a non-asbestos source of fibers a higher water source is required in the insulator to thereby provide more efficient cooling by the single mechanism of lowering the thermal conductivity of the rubber insulator by an improved water source which remains after a higher curing temperature employed in the curing of the rubber insulator.

A commonly assigned U.S. Pat. No. 4,008,170, titled: "Dry Water", was issued to Barry D. Allan on Feb. 15, 1977. This patent discloses a submicroscopic particulate silica having a particle size range from about 15–20 m$\mu$ that is prepared in a hot gaseous environment at about 1100° C. by the vapor phase hydrolysis of a silicon compound. This product is reacted with liquid water in a ratio in weight percent of about 9 parts water to 1 part of the particulate silica to yield a powdered product which remains flowable over a wide temperature—even when cooled to an extremely low temperature of –196° C. The adsorbed water is liberated on heating the powdered product. The powdered product with adsorbed water up to 90 weight percent has utility as a coolant by liberating water on heating. The powdered product is useful as moisture source for miscellaneous purposes over a wide temperature range.

The submicroscopic particulate silica employed to make "Dry Water" has no internal surface, therefore, the silica is in a finely divided state with an enormous external surface area. It is neither gelatinous nor a porous silica, whereas silica gels and silica aerogels are constituted of over 90% internal surface area. This makes the surface of the submicroscopic particulate silica highly reactive. One gram of the submicroscopic particulate silica contains over $11\times10^{15}$ particles and has a surface area of about 200 square meters.

Presently, industry standards include using water gel or other hydrate coolants in the rubber binder of insulations; therefore, this necessitates employing a cure system for the rubber at temperatures below 212° F. Compatibility of the coolants with the rubber is essential. An advantage of employing a water source with a higher temperature release would provide additional time for the rubber insulation to withstand a higher temperature. A source of water which can be processed with the rubber as a flowable solid and a source of water which can permit a cure temperature of a higher value without a loss of water during processing offers a distinct advantage. The distinct advantage envisioned is a higher available content of water in the rubber insulation after processing to thereby provide more efficient cooling as a result of lowering the thermal conductivity of the standard industry silicone rubber insulating ablative materials. The same general approach will probably be found useful in hard insulations as well as rubber insulations.

Therefore, an object of this invention is to provide a cool insulator comprising a rubber binder, a fiber filler selected from graphite fibers, or poly-p-ethylene terephthalamide (Kevlar), and a submicroscopic particulate water source, preferably silica, commonly known as "dry water". Dry water properties and method of preparation are disclosed in commonly assigned U.S. Pat. No. 4,008,170.

A further object of this invention is to provide a rubber insulator which contains from about 6% to about 10% water contained in a submicroscopic silica water source in a flowable solid which contains up to about 72% water.

Still a further object of this invention is to provide a rubber base insulator which retains a water source during processing, and during a curing temperature up to about 145° F., and a water source for water retention cooling up to about 150° C. to thereby provide an increase in the time to reach a predetermined temperature.

SUMMARY OF THE INVENTION

The cool insulator of this invention comprises a rubber binder in a weight percent amount from about 40 to about 50, a fiber filler selected from graphite fibers, or poly-p-ethylene terephthalamide (Kevlar) in a weight percent amount from about 30 to about 40, and a submicroscopic particulate water source in a weight percent amount from about 10 to about 20. A preferred submicroscopic particulate water source is submicroscopic particulate silica, commonly referred to a "dry water". Dry water properties and method of preparation are disclosed in commonly assigned U.S. Pat. No. 4,008,170. The cool insulator is a rubber based insulator which contains from about 6% to about 10% water contained in the specified submicroscopic silica which provides a water source in a flowable solid form containing up to about 72% water. The water source in the cool insulator formulation retains the water during processing, and during a curing temperature up to about 145° F. The cool insulator when employed in its environment of use provides a water source for water retention cooling up to about 150° C. to thereby providing an increase in the time to reach a predetermined temperature.

DESCRIPTION OF THE PREFERRED EMBODIMENT

The mechanism of the cool insulator takes advantage of the high heat capacity of water to cool and thereby lower the thermal conductivity of standard industry silicone rubber insulating ablative materials, such as Dow Corning DC 93-104 and Shin Etsu SE-X 32-878. The dry water filler is evaluated in formulations which are compared with each of the specified silicone rubber binders as a baseline formulations which did not contain dry water filler. The processing and cure of DC93-104 with dry water filler was problem free. Similar results were obtained with the Shin Etsu SE-X-32-878.

Although standard industry silicone rubber insulating ablative materials were use to illustrate the inclusion of "dry water", many other binders can be used. For example, EPDM (ethylene-propylene-diene-monomer), polybutadiene, polyisoprene, or other organic or inorganic polymers can be used. Similarly, while silicon dioxide is used as an example of the gellant, many other gellant materials may be use.

Chemical and physical binding of the water adsorbed in the dry water prevents evaporation of the water during processing, curing, and storage. The dry water employed contains 72% water with a 7 nm "EH5", a silicon dioxide gellant, by tradename of Cabot. The name water gel filler is dry water as employed in the invention. The dry water has the consistency of dry powder and is vacuum sensitive below the vapor pressure of water. The highest weight percentage of water that could be added to the gellant while maintaining the dry powder consistency was 72%. The most significant characteristics of this material are its coolant thermal properties. Thermogravimetric analysis (TGA) tests show water retention (cooling) up to 150° C.

EVALUATION TEST PROCEDURE EXAMPLE

A 2,000° F. propane torch test assembly was designed and fabricated for evaluating the the insulation capability. Thermal cooling measurements were made of insulating ablative materials. The insulation samples used in the proof-of-principle tests were 4" in diameter and ½" thick. The samples weighed approximately 150 grams each. Thermocouples were placed on the front and backside of the insulation samples during each test. Temperature measurements were recorded at 20 second intervals. The test were completed when the backside temperature reached 300° F.

Representative test data for the samples are shown below in Table 1. The 'baseline' samples are the Dow Corning material and the 'water' samples are the Dow Corning material filled with 10% dry water. TGA tests on samples containing dry water showed a water content of approximately 6% water after processing, curing, and storage as opposed to 7.2% water actually added. The loss of 1.2% water at ambient processing and cure temperature of 145° F.

TABLE I

TEST SAMPLE DATA

| Sample | Baseline-1 | Baseline-2 | Baseline-3 | Baseline-4 | Baseline-5 | Water-1 | Water-2 | Water-3 |
|---|---|---|---|---|---|---|---|---|
| dia, in | 4.02 | 4.025 | 4.027 | 3.995 | 4.004 | 4.003 | 4.023 | 3.995 |
| wt g | 148.870 | 151.875 | 152.519 | 151.634 | 154.618 | 139.934 | 146.837 | 142.828 |
| thick. in | 0.493 | 0.499 | 0.498 | 0.491 | 0.490 | 0.486 | 0.498 | 0.485 |
| vol. in$^3$ | 6.257 | 6.349 | 6.343 | 6.155 | 6.170 | 6.116 | 6.330 | 6.0790 |
| dens. lb/in$^3$ | 0.05247 | 0.05273 | 0.05301 | 0.05431 | 0.05525 | 0.05044 | 0.05114 | 0.023495 |

TABLE II

RESULTS OF TORCH TEST

| Sample | Time to 300° F. sec |
|---|---|
| Baseline 1 | 381 |
| Baseline 2 | 429 |
| Baseline 3 | 408 |
| Baseline 4 | 384 |
| Baseline 5 | 405 |
| Water 1 | 491 |
| Water 2 | 456 |
| Water 3 | 522 |

The most significant result of this test is that the addition of 10% dry water provides an average of a 22% increase in the time to reach 300° F. on the backside of the test samples. It should be noted also that the samples containing 10% dry water have lower density, which is better for rocket motor applications. In summation, the proof-of-principle testing verifies that silicone rubber insulating ablative material with additive of dry water provides improved thermal protection.

It is to be understood, therefore, that while the present invention has been described by means of specific examples, it should not be limited thereto, for obvious variations and modifications may occur to those skilled in the art and such variations and modifications may be adhered to without departing from the spirit of the invention or the scope of the appended claims.

We claim:

1. A cool insulator which contains a water source which is retained during processing and during a curing temperature of up to about 145° F., said water source functioning to provide water retention cooling up to about 150° C. for said cool insulator in its environment of use, said cool insulator comprising the ingredients when formulated as follows:
   (i) a rubber binder selected from the group consisting of silicon rubber, ethylene-propylene-diene-monomer, polybutadiene, and polyisoprene in a weight percent amount from about 40 to about 50;
   (ii) a fiber filler selected from the group consisting of graphite fibers, and poly-p-ethylene terephthalamide in a weight percent amount from about 30 to about 40; and,
   (iii) A submicroscopic particulate water source in a weight percent amount from about 10 to about 20, said submicroscopic particulate water source being in the form of a flowable solid when formulated and even when cooled to an extremely low temperature of −196° C., having a particle size range of 15–20 m$\mu$, and containing over $11 \times 10^{15}$ particles per gram and having a surface area of about 200 square meters per gram, and containing up to about 72% water, said submicroscopic particulate water source releasing water when employed in its environment of use upon heating to thereby provide more efficient cooling as a result of lowering the thermal conductivity of said cool insulator.

2. The cool insulator as defined in claim 1 wherein said rubber binder is silicon rubber in an amount of about 50 weight percent, said fiber filler is poly-p-ethylene terephthalamide in an amount of about of 40 weight percent, and said submicroscopic particulate water source is submicroscopic particulate silica in an amount of about 10 weight percent.

* * * * *